Aug. 7, 1934.　　R. C. SPRAGUE ET AL　　1,969,630
ELECTROLYTIC CONDENSER
Filed Feb. 9, 1933
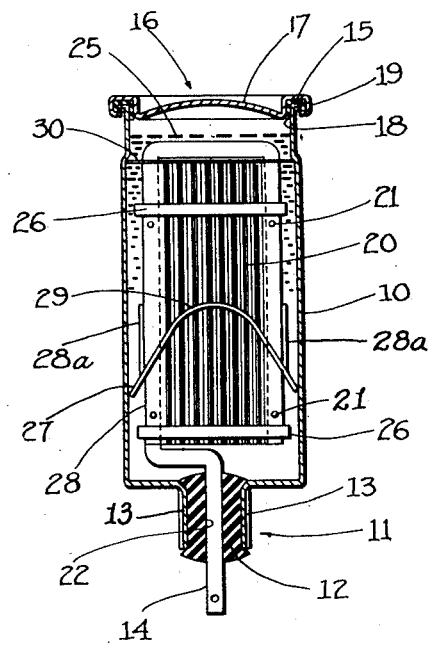
R.C. SPRAGUE
J. L. COLLINS
INVENTORS Patented Aug. 7, 1934

1,969,630

UNITED STATES PATENT OFFICE 1,969,630

ELECTROLYTIC CONDENSER

Robert C. Sprague and Joseph L. Collins, North Adams, Mass., assignors to Sprague Specialties Company, North Adams, Mass., a corporation of Massachusetts Application February 9, 1933, Serial No. 655,978

7 Claims. (Cl. 175—315)

Our invention relates to electrolytic devices and more particularly to improvements in the construction of electrolytic condensers.

Such electrolytic condensers consist as a rule of one or more film-forming electrodes immersed in a suitable electrolyte, which has a greater or lesser fluidity, and of a closed and sealed containing vessel which as a rule is of metal and may form an electrode of the condenser; and it is well known that in the operation of such condensers, gases are liberated at the electrodes, namely, oxygen and hydrogen, for the escape of which provision has to be made.

Various venting means have been provided for this purpose, for instance, vent-holes and vent-valves, through which the developed gases may escape. However, as the gases escape through the venting means, they also carry with them some of the electrolyte, partly carried out in liquid form and partly as the vapor of water or of other volatile components of the electrolyte. This is highly objectionable as it gradually alters and depletes the electrolyte and thus impairs the proper functioning of the condenser. For instance, if so much of the electrolyte is lost that the effective anode surface is no longer fully covered by the electrolyte, the capacity of the condenser is reduced and even before this occurs the concentration of the electrolyte might have been altered to such extent as to materially effect the electrical properties of the condenser.

It is therefore very important to prevent as much as possible the escape of the electrolyte with that of the liberated gases, and certain venting means described in the copending application Ser. No. 606,943, of R. C. Sprague and J. F. McCann, filed April 22, 1932, have resulted in a great improvement in this regard.

The venting means according to the above application consist in the interposition between two parts of the condenser container, for instance, between an open-ended cylindrical container and its closing cap, of a washer-shaped member of porous material, for instance, of a wax-impregnated cloth, through the pores of which the gas may escape, whereas the wax with which the cloth is impregnated effectively prevents leakage of the liquid electrolyte.

Such venting means may be conveniently referred to as a gasket-vent and this expression will be used hereafter for the sake of brevity.

While such a gasket-vent effectively prevents the liquid electrolyte from being carried out by the escaping gases, we have found that a loss of the electrolyte and more specifically, the escape of its volatile portions, can be greatly reduced if the pressure of the liberated gases is permitted to build up within the container to a much higher pressure than has been the case with previously used venting means.

The reduction in the loss of electrolyte, by permitting the gases in the container to build up to a high pressure, is due at least partly to the following:

As is well known, the electrolyte used for such condensers, generally consists of a salt, acid, alkali, or a combination of same, and of an ionizing solvent which is either water alone, or water in combination with other ionizing agents. In the container and more particularly in the space above the level of the liquid electrolyte, there is water vapor present, as well as the vapor of any further volatile component which the electrolyte may comprise. For instance, in the case of electrolytes comprising ammonium-borate, boric acid, etc., ammonia, ammonium borate and boric acid are such volatile components.

The pressure, and thus the amount in the above referred to space, of the water vapor and of the vapor of other volatile components of the electrolyte, is dependent solely on the temperature. In addition, this space also contains the gases which develop in operation, the pressure and amount of which, however, increases during the operation to a final value which depends upon the differential of pressure at which the venting means permit the escape of the gases. In addition, some air may be present in this space which, however, can be disregarded in the present consideration.

The usual venting means, for instance, vent-valves and vent-holes, operate at relatively low pressure differences and as a rule are responsive when the pressure within the container exceeds the atmospheric outside pressure by one to two pounds, or by about 65 to 130 mm. of mercury pressure. On the other hand, in the present invention, by sufficiently reducing the porosity of the gasket-vent, the excess pressure within the container may be built up to values of one atmosphere (760 mm. of mercury pressure) or even more.

As stated, the pressure of the water vapor within the container is solely dependent on the temperature and, for instance, at a temperature of 30° C. this pressure is 31.5 mm. of mercury pressure.

Assumed for the sake of simplicity that the atmosphere within the container only comprises the liberated gases and water vapor, and the overpressure at which the vents permit the gases to escape is 100 mm. of mercury pressure, the total gas pressure within the container will have to build up to 860 mm. of mercury pressure for the escape of the gases. In this case the proportion of water vapor in the mixture of the escaping gases is 31.5 to 860.

On the other hand, with a construction according to the invention, which permits the diffusion of the gases through the gasket-vent at an overpressure of an atmosphere, or thus when they have reached a pressure of 1520 mm. of mercury, the proportion of the amount of water vapor in the mixture of escaping gases is only 31.5 to 1520. Thus it will appear, that all conditions being equal, the amount of water vapor escaping with the liberated gases is about one-half in the case of the present invention as in the case of prior venting means.

What has been said in regard to water vapor similarly applies to the other volatile components of the electrolyte, the partial pressures of which are also relatively small compared with the pressure to which the liberated gases build up in the container before they can escape.

However, to render it possible to build up such high pressures in the container the condition may arise, especially in the case of electrolytic condensers of the type used in filter circuits of radio receiving devices,—which in view of the required low cost and low weight, have to be made of thin material,—that certain portions of the condenser cannot withstand without rupture or deformation such large gas pressures.

For instance, in the construction above referred to, the closing cap should be made of thin metal, so as to reduce material and manufacturing cost, as well as because it has to be well adapted to be crimped around the container to make a tight seal therewith. This cap when subjected to such high unbalanced pressures would rupture and deform unless special means were provided to prevent such occurrence.

According to the invention the cap is given, in a simple and inexpensive manner, a shape which imparts sufficient mechanical strength to withstand the prevalent pressures without the danger of deformation.

In the drawing forming part of this specification the single Figure 1 is a vertical sectional view of a condenser embodying our invention.

The condenser of the drawing represents a so-called wet electrolytic condenser adapted to be used in filter circuits and is shown to comprise a cylindrical metallic container 10, which preferably constitutes the cathode of the condenser and which may be either of filming or of non-filming metal, and is provided at one end with a reduced tubular extension 11. A liquid electrolyte 25 is provided in the container, for instance, an aqueous solution of ammonium borate and boric acid, the electrolyte filling the container close to its top.

A seal provided in the tubular extension 11 may consist of a plug 12 of rubber or other resilient material filling and extending both inwardly and outwardly beyond the extension 11. The plug 12 is provided with a central bore 22 through which protrudes an extension 14 of the anode assembly, later more fully described, said extension being secured in place by crimping the slightly oversized neck 11 so as to form two flutes 13—13 diametrically opposite each other, whereby a liquid and gas-tight seal is formed between the neck 11 and the plug 12, and also about an extension 14 of the anode assembly.

The other end of the container is provided with a circular re-entrant cap 16, the central portion of which is outwardly arched or crowned, as shown at 17.

The container is preferably provided at its free end and perpendicular to its axis, with a rim 15 around which is spun the edge 19 of the cap 16, with the interposition of a washer-shaped member 18 forming the gasket-vent.

The gasket-vent 18 is formed of a material which is porous but at the same time provides for a good liquid-tight seal, and preferably consists of a fine meshed fibre, for instance, a fine meshed cloth of gauze, impregnated with a suitable wax. The pores of the cloth afford escape for the gases, whereas the wax in the cloth effectively prevents leakage of the liquid electrolyte.

By sufficiently reducing the porosity of the gasket-vent, the pressure of the liberated gases can be built up in the container to high values, for instance, to an excess pressure of one atmosphere and even more. When, in operation, the pressure of the liberated gases has built up beyond such a pressure, a substantially constant and very slow escape of the gases takes place as long as the condenser is in operation. For the reasons above set forth the amount of water vapor and of the other volatile components of the electrolyte, is very small and at the same time practically no escape of the electrolyte in liquid form can take place.

The crowning of the cap 16 at the same time prevents the rupture or deformation of the cap.

The anode of the condenser may be of any suitable construction and is shown as consisting of a frame 28 having an inverted U shape. Attached to the frame is a foil 20 of relatively small thickness, which is folded back and forth upon itself in the manner of accordion pleating, and is riveted or otherwise secured to the legs of the U-shaped member at 21—21, the U-shaped frame extending in the aforementioned extension 14 which preferably forms therewith an integral part.

For the centering of the anode assembly a perforated insulating washer 30, for instance, of mica, may be provided. If desired, instead of, or in conjunction with the above washer 30, the anode may be centered by suitable insulating bands 26—26.

Also to impart a greater degree of rigidity to the anode, the latter may be surrounded by a punched strip 27 of thin hard rubber or celluloid adapted to slip over the anode 20. The strip 27 is provided with two lugs 28a—28a which lie along the edges of the frame 28, and also with a slot 29, which permits the strip to be placed over the anode assembly.

While we have described a specific construction of our invention and have illustrated its application to a specific condenser structure, we do not wish to be limited either to the constructive details of our invention or to its application to such structure, but desire the appended claims to be construed as broadly as permissible in view of the prior art.

What we now claim as new and desire to secure by Letters Patent is:

1. An electrolytic condenser comprising a metallic container open at one end, a liquid electrolyte in said container, and a film-forming electrode submerged in said electrolyte, a thin-walled metal cap having an outwardly arched face adapted to substantially close said open end of the container, said cap being secured to said container, and a finely meshed cloth washer impregnated with wax interposed between said cap and said container.

2. An electrolytic condenser comprising a container open at one end, a film-forming electrode in said container, and a liquid electrolyte in said container in which gases are developed during the operation of the condenser, a thin-walled metal cap for said open end of the container, said cap being outwardly arched, a porous washer interposed between the edges of said cap and of said container, said washer permitting the escape of gases and forming a liquid-tight seal, said cap, washer and container being crimped together.

3. An electrolytic condenser comprising a container having an open portion, an electrolyte in said container, and a film-forming electrode immerged therein, a thin-walled metal member closing said opening of the container and being so shaped as to withstand high inside pressures, and venting means to permit the intermittent escape of gases which develop in the operation of the condenser when the gases have reached a sufficiently high pressure line, said venting means comprising a washer which is substantially impermeable to liquid but porous for said higher pressure gases, said washer being interposed between said container and said member.

4. An electrolytic condenser comprising a metallic container, a film-forming electrode in said container, and a liquid electrolyte in said container in which gases are developed during the operation of the condenser, a re-entrant cap to substantially close said open end of the container, said cap being outwardly arched in its central portion, the edges of the container and the cap forming a narrow gap, a vent-gasket disposed in said gap, said vent-gasket being formed of a material which is substantially impermeable to liquid and only permits the passage of high pressure gases.

5. An electrolytic condenser having a container and a liquid electrolyte in said container in which gases are liberated during operation of the condenser, said container having a portion formed of a material which is permeable to high-pressure gases, but substantially impermeable to said liquid electrolyte, said container having a thin-walled end portion, said end portion being so shaped as to withstand the high-pressure gases without deformation.

6. An electrolytic device having a container and a liquid electrolyte in said container in which electrolyte gases develop during the operation of the device, said container having a portion formed of a material which is permeable to high pressure gases, but is substantially impermeable to said liquid electrolyte, said device having a thin end portion which is outwardly vaulted to withstand the high pressure of the gases.

7. An electrolytic condenser having a container, an aqueous electrolyte in said container, said electrolyte having volatile components, and in which electrolyte gases develop during operation, a vent-gasket provided on the top of said container and above the electrolyte level, said vent gasket adapted to pass high pressure gases and being liquid-tight, said container being so designed as to withstand the high pressure built up in the container without deformation.

ROBERT C. SPRAGUE.
JOSEPH L. COLLINS.